(12) United States Patent
Amamiya et al.

(10) Patent No.: US 8,160,797 B2
(45) Date of Patent: Apr. 17, 2012

(54) CONTROL APPARATUS AND CONTROL METHOD OF A VEHICLE

(75) Inventors: Sumiko Amamiya, Okazaki (JP); Koichiro Muta, Okazaki (JP); Yuichiro Kitamura, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 701 days.

(21) Appl. No.: 12/087,486

(22) PCT Filed: Jan. 3, 2007

(86) PCT No.: PCT/IB2007/000005
§ 371 (c)(1),
(2), (4) Date: Oct. 7, 2008

(87) PCT Pub. No.: WO2007/080464
PCT Pub. Date: Jul. 19, 2007

(65) Prior Publication Data
US 2009/0240411 A1     Sep. 24, 2009

(30) Foreign Application Priority Data
Jan. 10, 2006 (JP) .................. 2006-002566

(51) Int. Cl.
B60T 8/32 (2006.01)
G06F 7/70 (2006.01)
B60V 1/00 (2006.01)
(52) U.S. Cl. ............. 701/93; 701/70; 180/116
(58) Field of Classification Search .......... 701/22, 701/81, 70; 180/174–179, 202, 6.28, 6.5, 180/214, 216, 218, 242, 279, 53.5, 60, 65.1–65.8, 180/407, 412, 415, 422; 318/139–158; 280/735, 280/707, 422; 340/428
See application file for complete search history.

(56) References Cited

U.S. PATENT DOCUMENTS

| | | | |
|---|---|---|---|
| 5,925,087 A | * | 7/1999 | Ohnishi et al. ............... 701/70 |
| 6,169,949 B1 | * | 1/2001 | Sato ............................... 701/51 |
| 2005/0101433 A1 | * | 5/2005 | Joe ................................. 477/5 |

FOREIGN PATENT DOCUMENTS

| | | |
|---|---|---|
| EP | 0 382 191 A1 | 8/1990 |
| EP | 0 901 929 A1 | 3/1999 |
| EP | 1 199 209 A2 | 4/2002 |
| EP | 1 349 131 A1 | 10/2003 |
| JP | A-2003-285725 | 10/2003 |
| JP | A-2004-045423 | 2/2004 |
| JP | A 2005-33866 | 2/2005 |
| JP | A-2007-126057 | 5/2007 |

OTHER PUBLICATIONS

Office Action issued in Japanese Application No. 2006-002566, dated Aug. 19, 2010 (with partial English translation).
T. Massel et al.; "Identification of Road Gradient and Vehicle Pitch Angle;" Proceedings of the 2004 IEEE International Conference on Control Applications; Taipei, Taiwan, Sep. 2, 2004; pp. 1284-1289; XP010763973.

* cited by examiner

Primary Examiner — James Trammell
Assistant Examiner — Muhammad Shafi
(74) Attorney, Agent, or Firm — Oliff & Berridge, PLC

(57) ABSTRACT

An HV_ECU executes a program including a step of calculating an estimated gradient, a step of performing rate limit processing on a change in the estimated gradient when on a hill and an absolute value of the vehicle speed is equal to or below V(0), a step of performing hysteresis processing, a step of calculating a creep increase coefficient, and a step of calculating a creep increase torque.

13 Claims, 8 Drawing Sheets

CONTROL APPARATUS AND CONTROL METHOD OF A VEHICLE

BACKGROUND OF THE INVENTION

1. Field of the Invention

The invention relates to a control apparatus and a control method of a vehicle. More particularly, the invention relates to a control apparatus and a control method of a vehicle which uses a motor as a driving source.

2. Description of the Related Art

In recent years, vehicles which run by the driving force generated by a motor such as hybrid vehicles, fuel cell vehicles, and electric vehicles have been the focus of much attention as one measure to combat environmental problems. In these kinds of vehicles, technology is known for generating creep torque using the motor in order to prevent the vehicle from moving backwards when taking off from a standstill or when stopped on an upward slope, for example.

Japanese Application Publication No. JP-A-2005-33866, for example, describes a control apparatus of a hybrid vehicle that prevents brake drag when the vehicle takes off from a standstill, while also preventing the vehicle from moving backwards on an upward slope. This control apparatus of a hybrid vehicle includes a motor and an engine as vehicle driving sources. The control apparatus also includes an operation detecting device that detects an operation of a brake pedal, a gradient detecting device that detects a road surface gradient, and a motor controlling portion that generates forward torque in the motor when the gradient detecting device detects that the road surface on which the vehicle is stopped is an upward slope and the operation detecting device detects that there is an operation to release the brake pedal.

According to the control apparatus of a hybrid vehicle described in the foregoing publication, when the engine is idling while the vehicle is stopped on an upward slope, creep torque in the engine can be generated using the motor. Therefore, the motor can effectively be used to prevent the problem of brake drag which reduces fuel efficiency, as well as to reliably prevent the vehicle from moving backwards on an upward slope.

However, if the detected road surface gradient changes suddenly, the creep torque fluctuates and the driver may feel as if the vehicle is sliding downhill. The road surface gradient is calculated based on the difference between an output value from a G sensor and a derivative value of the rotation speed detected by a wheel speed sensor. The wheel speed sensor outputs a detection signal after the vehicle has started to move and is traveling around several km/h. Therefore, the derivative value of the rotation speed at the point at which the detection signal starts to be output is large and the absolute value of the road surface gradient is estimated to be small. As a result, the creep torque output by the motor stops increasing which may result in the vehicle sliding downhill backwards when running on an upward slope, thereby imparting an unpleasant sensation to the driver.

SUMMARY OF THE INVENTION

It is an object of this invention to provide a control apparatus and control method of a vehicle which suppresses downhill sliding of a vehicle on an upward slope.

A first aspect of the invention relates to a control apparatus of a vehicle, which controls driving force of the vehicle according to a road surface gradient. This control apparatus includes an acceleration detecting device that detects acceleration of the vehicle; a rotation speed detecting device that detects a rotation speed of a wheel; a vehicle speed calculating portion that calculates a vehicle speed based on the rotation speed detected by the rotation speed detecting device; and an estimating portion that estimates the road surface gradient based on the acceleration and the rotation speed. The estimating portion limits a change amount of the estimated road surface gradient when an absolute value of a current vehicle speed is equal to or below a lower limit value of an absolute value of a vehicle speed corresponding to the rotation speed which can be detected by the rotation speed detecting device.

According to the first aspect, the estimating portion limits a change amount of the estimated road surface gradient when a current vehicle speed is equal to or below a lower limit value of an absolute value of a vehicle speed corresponding to the rotation speed which can be detected by the rotation speed detecting device. As a result, the change amount of the estimated road surface gradient is limited even when the derivative value of the rotation speed abruptly changes when the vehicle speed reaches several km/h after the vehicle starts to move. Therefore, an abrupt change in the estimated road surface gradient can be suppressed. Accordingly, for example, in a vehicle that is stopped on an upward slope, an abrupt change in the estimated road surface gradient can be suppressed when the driver releases the brake pedal and the vehicle starts to move. That is, on an upward slope, an abrupt decrease in the estimated road surface gradient can be suppressed. As a result, the creep torque can be increased appropriately according to the road surface gradient, which makes it possible to suppress the vehicle from sliding downhill backwards and thus minimize the unpleasant sensation imparted on the driver. Hence, a control apparatus of a vehicle that suppresses downhill sliding of a vehicle on an upward slope can be provided.

In addition to the foregoing structure, the estimating portion may limit the change amount of the estimated road surface gradient to equal to or below a predetermined change amount.

According to this structure, the estimating portion limits the change amount to equal to or below a predetermined change amount. As a result, the change amount of the estimated road surface gradient is limited to equal to or below the predetermined change amount even when the derivative value of the rotation speed abruptly changes when the vehicle speed reaches several km/h after the vehicle starts to move. Therefore, an abrupt change in the estimated road surface gradient can be suppressed. As a result, on an upward slope, the creep torque can be increased appropriately according to the road surface gradient, which makes it possible to suppress the vehicle from sliding downhill backwards.

A second aspect of the invention relates to a control apparatus of a vehicle, which controls driving force of the vehicle according to a road surface gradient. This control apparatus includes an acceleration detecting device that detects acceleration of the vehicle; a rotation speed detecting device that detects a rotation speed of a wheel; and an estimating portion that estimates the road surface gradient based on the acceleration and the rotation speed. The estimating portion estimates the road surface gradient by correcting the road surface gradient based on the detected acceleration when the detected acceleration is not within a predetermined range corresponding to the estimated road surface gradient.

According to this structure, the estimating portion estimates the road surface gradient by correcting it based on the detected acceleration when the detected acceleration is not within a predetermined range corresponding to the estimated road surface gradient. Therefore, it can be determined that the estimated road surface gradient is changing abruptly, i.e., that the derivative value of the rotation speed is changing abruptly, when the acceleration detected by the acceleration detecting device is not within a predetermined range that corresponds to the estimated road surface gradient. Accordingly, estimating the road surface gradient by appropriately correcting the road surface gradient based on the detected acceleration enables an abrupt change in the creep torque to be suppressed. Thus, for example, in a vehicle that is stopped on an upward slope, an abrupt change in the estimated road surface gradient can be suppressed when the driver releases the brake pedal and the vehicle starts to move. That is, on an upward slope, an abrupt decrease in the estimated road surface gradient can be suppressed. As a result, the creep torque can be increased appropriately according to the road surface gradient so the vehicle can be suppressed from sliding downhill backwards. Accordingly, the unpleasant sensation imparted on the driver from the vehicle sliding backwards can be minimized. Thus, a control apparatus of a vehicle that suppresses downhill sliding of a vehicle on an upward slope can be provided.

In addition to the foregoing structure, a motor which serves as a driving source that generates the driving force may be mounted in the vehicle, and the control apparatus may control the motor according to the estimated road surface gradient.

According to this structure, the control apparatus controls the motor according to the estimated road surface gradient. Therefore, a vehicle on an upwards slope can be suppressed from sliding downhill because creep torque according to the estimated road surface gradient can be output.

A third aspect of the invention relates to a control method of a vehicle, which controls driving force of the vehicle according to a road surface gradient. This control method includes the steps of detecting acceleration of the vehicle; detecting a rotation speed of a wheel; calculating a vehicle speed based on the detected rotation speed; estimating the road surface gradient based on the acceleration and the rotation speed; and limiting a change amount of the estimated road surface gradient when an absolute value of a current vehicle speed is equal to or below a lower limit value of an absolute value of a vehicle speed corresponding to the rotation speed that can be detected.

This control method may also include the step of limiting the change amount to equal to or below a predetermined change amount.

A fourth aspect of the invention relates to a control method of a vehicle, which controls driving force of the vehicle according to a road surface gradient. This control method includes the steps of detecting acceleration of the vehicle; detecting a rotation speed of a wheel; estimating the road surface gradient based on the acceleration and the rotation speed; and estimating the road surface gradient by correcting the road surface gradient based on the detected acceleration when the detected acceleration is not within a predetermined range corresponding to the estimated road surface gradient.

This control method may also include the step of controlling, according to the estimated road surface gradient, a motor which serves as a driving source that generates the driving force.

A fifth aspect of the invention relates to a control apparatus of a vehicle, which controls driving force of the vehicle according to a road surface gradient. This control apparatus includes an acceleration detecting device that detects acceleration of the vehicle; a rotation speed detecting device that detects a rotation speed of a wheel; and an estimating portion that estimates the road surface gradient based on the acceleration and the rotation speed, wherein the estimating portion limits a change amount of the estimated road surface gradient to equal to or below a predetermined change amount until the rotation speed is detected by the rotation speed detecting device.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
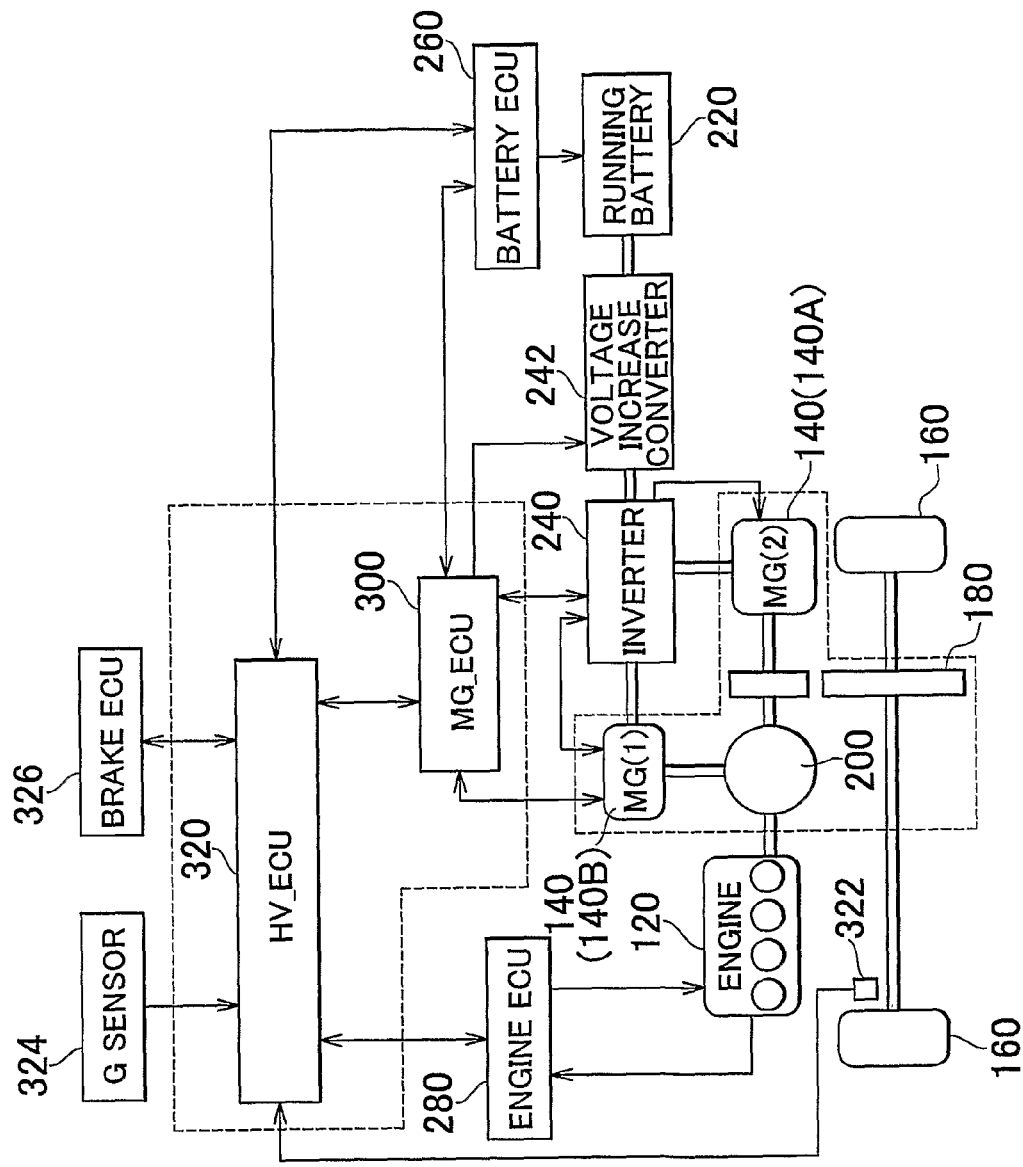
FIG. 1 is a control block diagram of a hybrid vehicle in which is mounted a control apparatus of a vehicle according to a first embodiment of the invention.

Hereinafter, embodiments of the invention will be described in detail with reference to the accompanying drawings. In the following description, like parts with be denoted by like reference numerals. Like parts will also be referred to by same nomenclature and will have the same function. Therefore, detailed descriptions of those parts will not be repeated.

A control block diagram of a hybrid vehicle according to a first embodiment of the invention will now be described with reference to FIG. 1. It should be noted, however, that the invention is not limited to the hybrid vehicle shown in FIG. 1 as long as a motor-generator which serves as a driving source is coupled to driven wheels. The hybrid vehicle may also take another form having a secondary battery. Also, an electricity storing mechanism such as a capacitor may be provided instead of the secondary battery. In addition, when the secondary battery is provided, it may be a nickel-metal hydride battery or a lithium-ion battery, for example. The type is not particularly limited.

The hybrid vehicle includes an internal combustion engine (in the following description this will simply be referred to as "engine") 120 such as a gasoline engine, and a motor-generator 140, both of which serve as driving sources. In FIG. 1, the motor-generator 140 will be referred to as motor 140A and generator 140B (or motor-generator 140B) for the sake of convenience, but the motor 140A can also function as a generator and the generator 140B can also function as a motor depending on the running state of the hybrid vehicle. When functioning as a generator, the motor-generator performs regenerative braking at which time it converts the kinetic energy of the vehicle into electrical energy, thereby decelerating the vehicle.

The hybrid vehicle is also provided with a reduction gear 180 that transmits power generated by the engine 120 and the motor-generator 140 to driven wheels 160, as well as transmits the driving of the driven wheels 160 to the engine 120 and the motor-generator 140; a power split device (such as a planetary gear set) 200 which distributes the power generated by the engine 120 between two paths, i.e., the driven wheels 160 and the generator 140B; a running battery 220 which provides electric power to drive the motor-generator 140; an inverter 240 that controls the current while converting direct current of the running battery 220 and alternating current of the motor 140A and the generator 140B; a battery control unit (hereinafter referred to as "battery ECU" (ECU stands for Electronic Control Unit)) 260 that manages and controls the charge and discharge state of the running battery 220; an engine ECU 280 that controls the operating state of the engine 120; a MG_ECU 300 that controls the motor-generator 140, the battery ECU 260, the inverter 240 and the like according to the state of the hybrid vehicle; a brake ECU 326 that controls the braking force of brake devices, not shown; and a HV_ECU 320 that controls the overall hybrid system so that the hybrid vehicle can run most efficiently by managing and controlling the battery ECU 260, the engine ECU 280, the MG_ECU 300, and the brake ECU 326 and the like all in an interconnected manner. The control apparatus of a vehicle according to this embodiment is realized by this HV_ECU 320.

In this embodiment, a voltage increase converter 242 is provided between the running battery 220 and the inverter 240. This voltage increase converter 242 increases the voltage of the power when power is supplied from the running battery 220 to the motor 140A and the motor-generator 140B because the rated voltage of the running battery 220 is lower than the rated voltage of the motor 140A and the motor-generator 140B.

In FIG. 1, each ECU is structured separately, but two or more ECUs may be combined into one (for example, the MG_ECU 300 and the HV_ECU 320 can be combined into one ECU, as shown by the dotted line in FIG. 1).

A planetary gear set is used for the power split device 200 to divide the power from the engine 120 between the driven wheels 160 and the motor-generator 140B. The power split device 200 can also function as a continuously variable transmission by controlling the speed of the motor-generator 140B. Rotation force of the engine 120 is input to a planetary carrier. From there it is transmitted to the motor-generator 140B by a sun gear, and transmitted to the motor and an output shaft (on the side with the driven wheels 160) by a ring gear. When the engine 120 is idling, it is still running so kinetic energy from its operation is converted into electric energy by the motor-generator 140B, thereby reducing the speed of the engine 120.

In the hybrid vehicle having the hybrid system shown in FIG. 1, when the efficiency of the engine 120 is poor and the vehicle is taking off from a standstill or running at low speeds or the like, the hybrid vehicle runs using only the motor 140A of the motor-generator 140. During normal running, power from the engine 120 is distributed between two paths by the power split device 200, for example, so as to directly drive the driven wheels 160 on one hand, as well as drive the generator 140B to generate power on the other hand. The power generated at this time is used to drive the motor 140A which is in turn used to assist with driving the driven wheels 160. When running at high speeds, the running battery 220 supplies power to the motor 140A to further increase its output, thereby providing additional driving force to the driven wheels 160. During deceleration, on the other hand, the motor 140A which is then driven by the driven wheels 160 functions as a generator and regenerates energy. This recovered energy is then stored in the running battery 220.

When the SOC (state-of-charge) of the running battery 220 drops to the point where it needs to be charged, the output of the engine 120 is increased to drive the generator 140B and increase the amount of power it generates, thereby increasing the SOC of the running battery 220. Of course, even when running at low speeds, control is performed to increase the driving amount of the engine 120 as needed. This control is performed in cases such as when the running battery 220 needs to be charged as described above, when driving an auxiliary device such as an air conditioner, and when raising the temperature of coolant in the engine 120 to a predetermined temperature.

The wheel speed sensor 322 detects the rotation speed of the driven wheels 160 and outputs a signal indicative thereof to the HV_ECU 320. The HV_ECU 320 then calculates the speed of the vehicle based on the speed of the driven wheels 160 that was received. Also, the G sensor 324 detects acceleration of the vehicle and outputs a signal indicative thereof to the HV_ECU 320.

In this kind of vehicle, the HV_ECU 320 estimates the gradient of the road surface based on the difference between the output value from the G sensor 324 and the derivative value of the rotation speed from the wheel speed sensor 322 when the vehicle is stopped or moving on a road surface having a gradient, for example. For example, the HV_ECU 320 estimates the gradient of the road surface based on factors such as the weight of the vehicle and the difference between the output value from the G sensor 324 and the derivative value of the rotation speed from the wheel speed sensor 322. The HV_ECU 320 then prevents the vehicle from sliding backwards by controlling the motor 140A to output forward creep torque according to the estimated gradient of the road surface (hereinafter also referred to as "estimated gradient"). More specifically, the HV_ECU 320 controls the motor 140A to output a value equal to the product of the creep torque on a flat road multiplied by a creep increase coefficient according to the gradient of the road surface (hereinafter this value will be referred to as "creep increase torque"). For example, if the creep torque coefficient is "1" on a flat road, then the creep increase coefficient on an upward slope will be a value greater than "1".

Figure 2A:
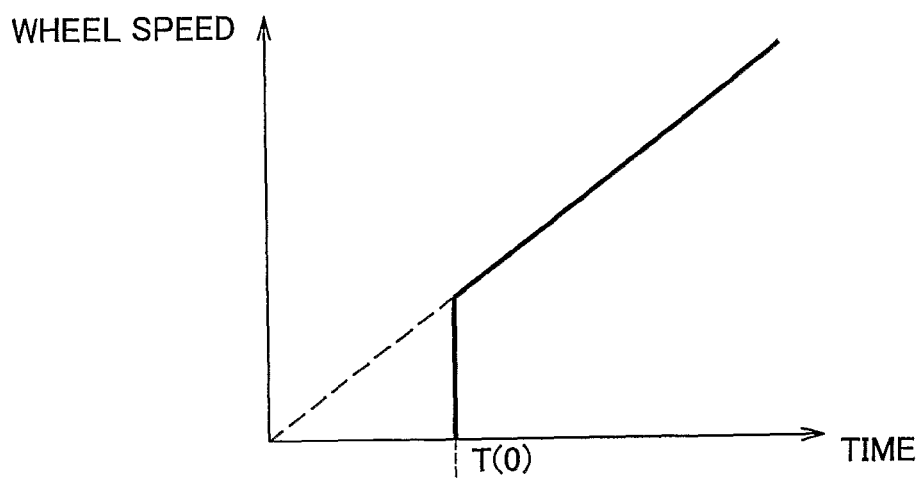
FIG. 2A is a timing chart showing a change in an output value detected by a wheel speed sensor.

Here, a case will be assumed in which, for example, a vehicle that is stopped on an upward slope starts to move after the driver releases the brake pedal. If the force acting to move the vehicle backwards, which is based on the vehicle weight, exceeds the creep torque output to the driven wheels 160 at this time, then the vehicle will start to move backwards, as shown by the broken line in FIG. 2A, so the wheel speed will increase linearly. However, the wheel speed sensor 322 starts to output a detection signal only after a time T(0) when the vehicle speed in the downhill direction has reached several km/h (approximately 3 km/h) after the vehicle starts to move, as shown by the solid line in FIG. 2A. This is because the sensor is structured to detect a change in the magnetic force produced by the rotation of the driven wheels 160 so a detection signal is not detected unless the wheel speed rises to at least a rotation speed at which a change in the magnetic force can be detected.

Figure 2B:
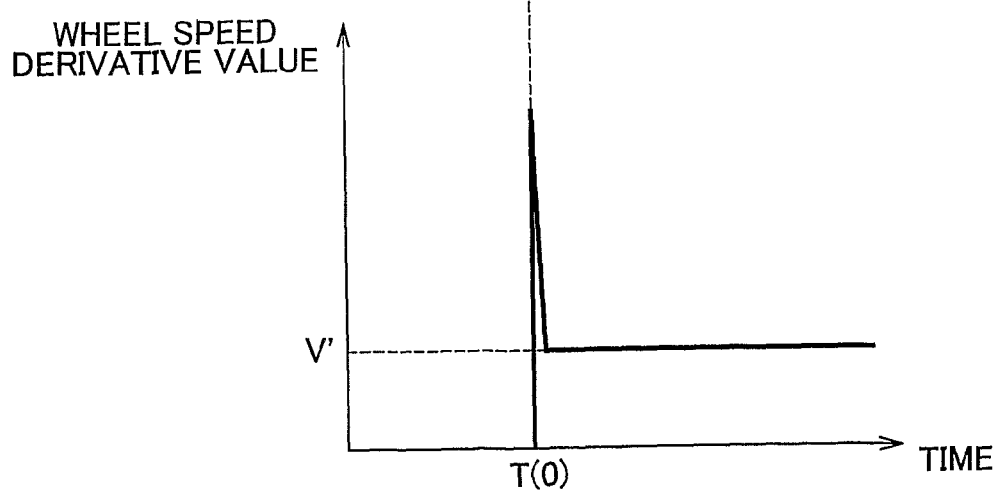
FIG. 2B is a timing chart showing a derivative value of the output value detected by a wheel speed sensor.

Therefore, as shown by the solid line in FIG. 2B, the derivative value of the output value from the wheel speed sensor 322, i.e., the derivative value of the wheel speed, abruptly rises at time T(0) and then falls to V'. The estimated gradient is calculated based on the difference between the output value from the G sensor 324 and the derivative value of the output value from the wheel speed sensor 322, as described above. Therefore, when the derivative value of the output value from the wheel speed sensor 322 abruptly changes (i.e., abruptly increases in the downhill direction on an upward slope), the estimated gradient abruptly decreases. That is, the HV_ECU 320 estimates that the road surface gradient is becoming gradual. As a result, the HV_ECU 320 controls the creep increase torque generated in the motor 140A to decrease because the creep increase coefficient is decreasing according to the decrease in the estimated gradient. Therefore, the resultant force from the vehicle in the downhill direction increases which may cause the vehicle to slide downhill. As a result, an unpleasant sensation may be imparted to the driver.

Therefore, this embodiment is characteristic in that the HV_ECU 320 estimates the road surface gradient while limiting the amount of change in the road surface gradient when the vehicle speed is to equal to or below a lower limit value of the absolute value of a vehicle speed corresponding to a rotation speed that can be detected by the wheel speed sensor 322.

More specifically, when the absolute value of the vehicle speed calculated based on the wheel speed that was detected by the wheel speed sensor 322 is equal to or below a predetermined value V(0), the HV_ECU 320 limits the amount of change in the estimated gradient calculated based on the difference between the output value from the G sensor 324 and the derivative value of the output value from the wheel speed sensor 322 to a predetermined amount of change or less. The "predetermined value V(0)" is not particularly limited as long as it is at least equal to or greater than a lower limit value Va of the absolute value of the vehicle speed calculated based on the wheel speed that was detected by the wheel speed sensor 322.

Hereinafter, the control structure of a program executed by the HV_ECU 320 which serves as the control apparatus of the vehicle according to the embodiment will be described with reference to FIG. 3.

In step S100, the HV_ECU 320 calculates the estimated gradient based on the difference between the output value received from the G sensor 324 and the derivative value of the output value received from the wheel speed sensor 322. The estimated gradient may alternatively be calculated in the brake ECU 326 based on the output value from the G sensor 324 and the derivative value of the wheel speed, and then sent to the HV_ECU 320.

In step S102, the HV_ECU 320 determines whether the road surface on which the vehicle is running or stopped is a hill (i.e., slope) based on the calculated (or received) estimated gradient. For example, if the calculated gradient is equal to or greater than a predetermined gradient A(X), the HV_ECU 320 determines that the road surface on which the vehicle is running or stopped is a hill. If the road surface on which the vehicle is running or stopped is a hill (i.e., YES in step S102), the process proceeds on to step S104. If not (i.e., NO in step S102), the process proceeds on to step S114.

In step S104, the HV_ECU 320 determines whether the absolute value of the vehicle speed calculated based on the rotation speed detected by the wheel speed 322 is equal to or below a predetermined value V(0). If the absolute value of the calculated vehicle speed is equal to or below the predetermined value V(0) (i.e., YES in step S104), the process proceeds on to step S106. If not (i.e., NO in step S104), the process proceeds on to step S108.

Figure 4:
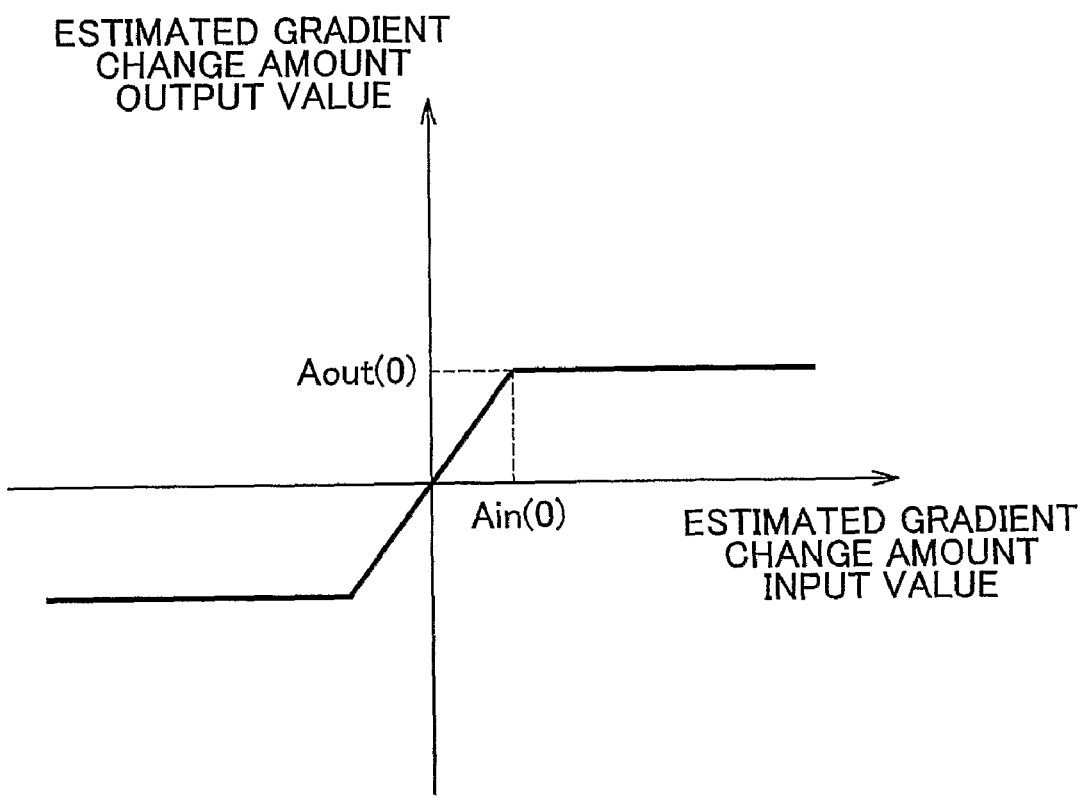
FIG. 4 is a graph showing the relationship between an input value and an output value of an estimated gradient change amount.

In step S106, the HV_ECU 320 performs rate limit processing on the change in the calculated (or received) estimated gradient. Rate limit processing refers to processing in which, when the difference between the estimated gradient calculated in the last calculation cycle and the estimated gradient calculated in the current calculation cycle is equal to or greater than a predetermined change amount Aout(0), for example, calculates the sum of the estimated gradient calculated in the last calculation cycle plus the predetermined change amount Aout(0) as the estimated gradient of the current calculation cycle. More specifically, a map such as that shown in FIG. 4 is stored beforehand in the memory of the HV_ECU 320. The HV_ECU 320 calculates the output value Aout of the change amount from a map such as that shown in FIG. 4, with the difference between the estimated gradients calculated based on the output value of the G sensor 324 and the derivative value of the wheel speed in the last calculation cycle and the current calculation cycle as an input value Ain. The HV_ECU 320 then calculates the estimated gradient of the current calculation cycle by adding the calculated output value Aout of the change amount to the estimated gradient that was calculated in the last calculation cycle. For example, the map shown in FIG. 4 is created so that the output value of the change amount of the estimated gradient does not become larger than Aout(0) even if the input value of the change amount of the estimated gradient is equal to or greater than Ain(0). Ain(0) and Aout(0) are preset values which are appropriately determined through testing or the like. Also, in the map shown in FIG. 4, the upward direction of the vertical axis is the downhill direction of the vehicle.

In step S108, the HV_ECU 320 determines whether latch processing has been performed. Latch processing is processing for retaining (storing) the value of the estimated gradient calculated (or received) by the HV_ECU 320 every predetermined number of calculation cycles. The predetermined number of calculation cycles may be, for example, one or a plurality of two or more. If latch processing has been performed (i.e., YES in step S108), the process proceeds on to step S110. If not (i.e., NO in step S108), the process proceeds on to step S112.

In step S110, the HV_ECU 320 performs hysteresis processing on the change in the estimated gradient stored by the latch processing. Hysteresis processing is processing that makes the estimated gradient which changes in small increments due to noise and the like a substantially constant value, for example. More specifically, when the absolute value of the difference between the value of the estimated gradient calculated in the last calculation cycle and the value of the estimated gradient calculated in the current calculation cycle is equal to or below a predetermined value, the HV_ECU 320 makes the value of the current estimated gradient the same as the value of the estimated gradient calculated in the last calculation cycle. The predetermined value in this case is a value that is below the predetermined change amount Aout (0).

Figure 5:
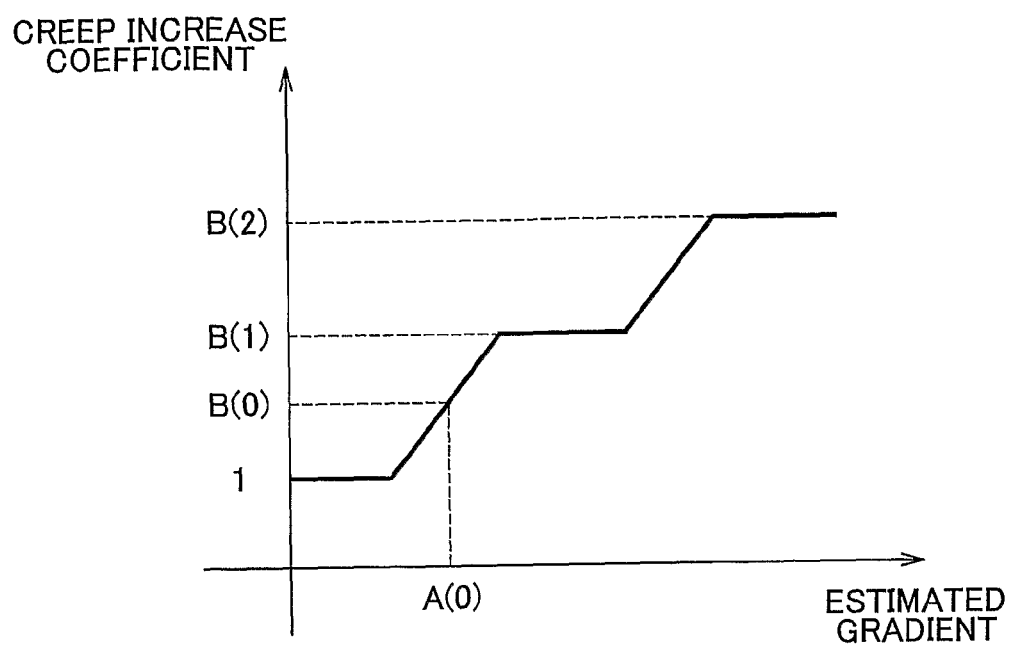
FIG. 5 is a graph (first graph) showing a relationship between an estimated gradient and a creep increase coefficient.
Figure 6:
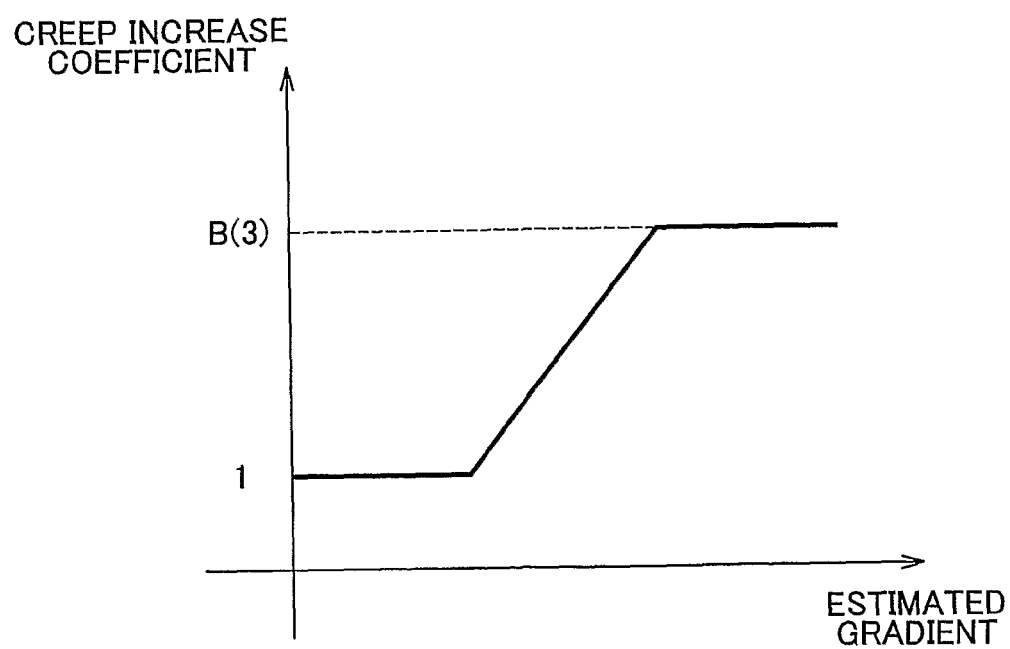
FIG. 6 is a graph (second graph) showing a relationship between the estimated gradient and the creep increase coefficient.

In step S112, the HV_ECU 320 calculates the creep increase coefficient based on the calculated estimated gradient. More specifically, a map which predefines a relationship between the estimated gradient and the creep increase coefficient, such as that shown in FIG. 5, is stored in the memory of the HV_ECU 320. The HV_ECU 320 calculates the creep increase coefficient from the calculated estimated gradient and the map shown in FIG. 5. For example, when the calculated estimated gradient is A(0), the HV_ECU 320 calculates a creep increase coefficient B(0) from the map shown in FIG. 5. The relationship between the estimated gradient and the creep increase coefficient is not limited to one in which the creep increase coefficient rises in a step-like manner from 1 to B(1) and B(2) as the estimated gradient increases. For example, as shown in FIG. 6, the creep increase coefficient may also be one in which the creep increase coefficient rises in a step-like manner from 1 to B(3) as the estimated gradient increases. B(1) to B(3) are values which are not particularly limited as long as they are greater than "1", and are appropriately determined through testing or the like. Also, a 3-dimensional map showing the relationship between the estimated gradient, the rotation speed of the driven wheels 160 detected by the wheel speed sensor 322 (or the vehicle speed), and the creep increase coefficient may also be used instead of the map shown in FIG. 5.

In step S114, the HV_ECU 320 calculates the creep increase torque based on the calculated creep increase coefficient. For example, the HV_ECU 320 calculates the creep increase torque to be equal to the product of the creep increase coefficient multiplied by the creep torque calculated using a driving force map or the like. The driving force map is a map which defines the relationship between the vehicle speed and the creep torque, for example, and is stored in the memory of the HV_ECU 320 in advance. The HV_ECU 320 calculates the creep torque using the driving force map and the vehicle speed calculated based on the rotation speed detected by the wheel speed sensor 322. The HV_ECU 320 calculates the creep increase torque to be equal to the product of the creep increase coefficient and the calculated creep torque. The HV_ECU 320 then controls the motor 140A to output the calculated creep increase torque via the MG_ECU 300.

Figure 7A:
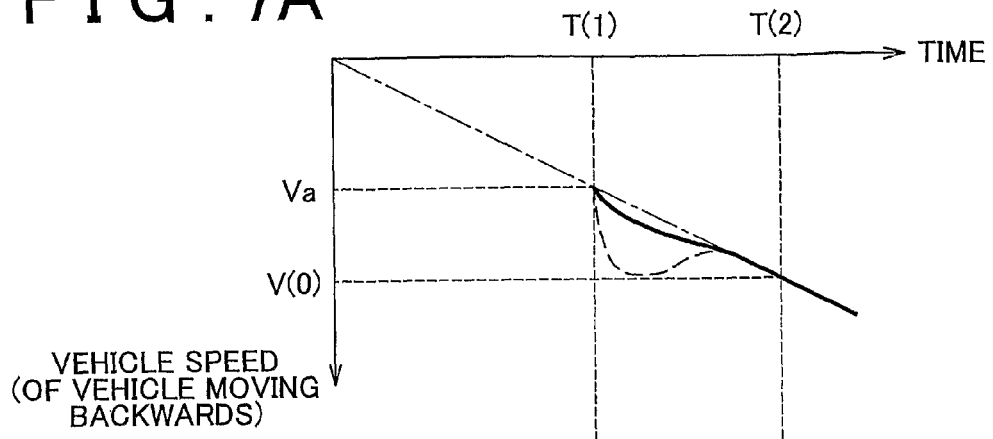
FIG. 7A is a timing chart showing changes in the vehicle speed.

The operation of the HV_ECU 320 that serves as the control apparatus of a vehicle according to this embodiment and is based on the foregoing structure and flowchart will now be described with reference to FIG. 7.

This description will assume a case in which, for example, the vehicle is stopped facing uphill on an upward slope. While the vehicle is stopped, the output value detected by the wheel speed sensor 322 is zero so the derivative value of the wheel speed is also zero. Therefore, the estimated gradient A(1) is calculated based on the output value from the G sensor 324. Here, if the driver releases the brake pedal, for example, a backward force from the weight of the vehicle acts on the vehicle. If that backward force is greater than the creep torque that is output in the forward direction, the vehicle will start to move backwards. The vehicle speed will then increase over time as shown by the alternate long and short dash line in FIG. 7A. If at that time the vehicle speed is below the vehicle speed Va which corresponds to the rotation speed that can be detected by the wheel speed sensor 322, the output value is zero, as shown by the solid line in FIG. 7A.

When the vehicle speed becomes Va which corresponds to a rotation speed that can be detected by the wheel speed sensor 322 at time T(1), then an output value corresponding to the vehicle speed is output from the wheel speed sensor 322. At this time the estimated gradient is calculated based on the output value from the G sensor 324 and the derivative value of the output value from the wheel speed sensor 322 (S100).

Figure 7B:
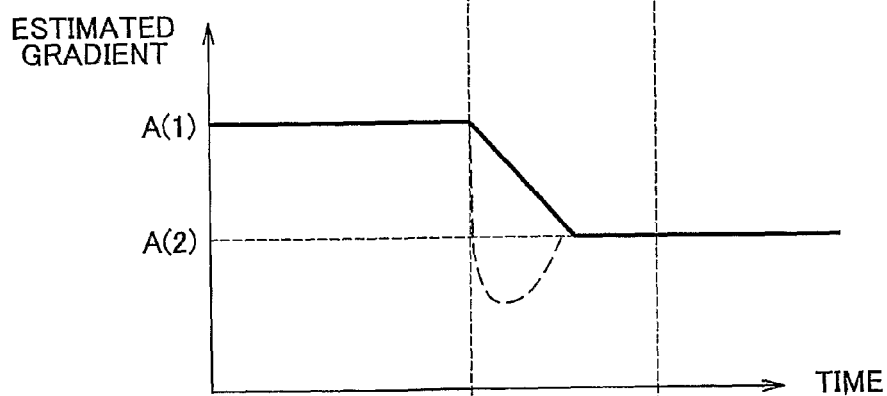
FIG. 7B is a timing chart showing the estimated gradient.

If the calculated estimated gradient is equal to or greater than a predetermined gradient A(X) (i.e., YES in step S102), then it is determined that the vehicle is moving or stopped on an upward slope. Then if the absolute value of the calculated vehicle speed is below a predetermined vehicle speed V(0) (i.e., YES in step S104), rate limit processing is performed on the change in the estimated gradient (S106). At this time, the change in the estimated gradient with the rate limit processing shown by the solid line in FIG. 7B is compared with the change in the estimated gradient without the rate limit processing shown by the broken line in FIG. 7B, and the estimated gradient is calculated to change gradually from A(1) to A(2) by the predetermined change amount Aout(0). After latch processing and hysteresis processing (i.e., YES in step S108; S110), the creep increase coefficient is calculated based on the estimated gradient after hysteresis processing (S112). Then the creep increase torque is calculated based on the creep increase coefficient and the driving force map (S114).

Figure 7C:
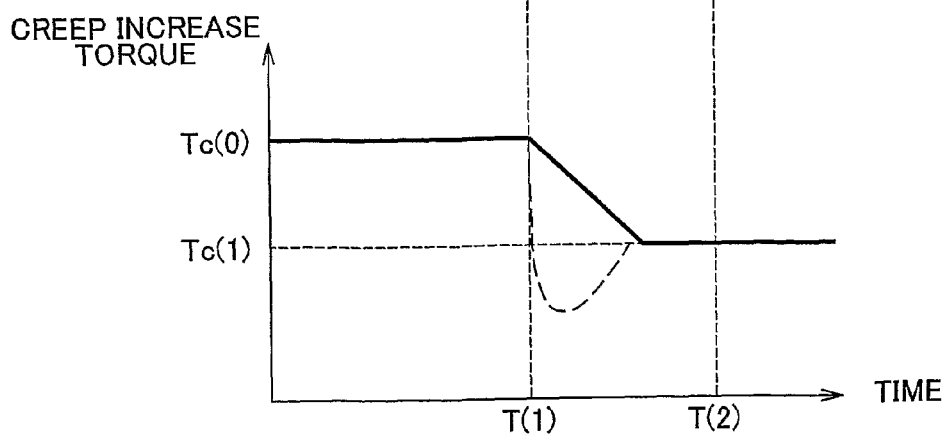
FIG. 7C is a timing chart showing the creep torque.

At this time, the change in the creep increase torque with the rate limit processing shown by the solid line in FIG. 7C is compared with the change in the creep increase torque the without rate limit processing shown by the broken line in FIG. 7C, and the creep increase torque is changed gradually from Tc(0) to Tc(1) by a predetermined change amount. Therefore, as shown by the solid line after time T(1) in FIG. 7A, the vehicle can be suppressed from sliding backwards due to an abrupt decrease in creep increase torque.

As described above, with the control apparatus of a vehicle according to this embodiment, even if the rotation speed detected by the wheel speed sensor is output after the vehicle starts to move and the vehicle speed has reached several km/h such that the derivative of the rotation speed abruptly changes, the amount of change in the estimated road surface gradient can be limited. As a result, the estimated road surface gradient can be suppressed from abruptly changing. Therefore, in a vehicle that is stopped on an upward slope, an abrupt change in the estimated road surface gradient can be suppressed when the driver releases the brake pedal and the vehicle starts to move. That is, on an upward slope, an abrupt decrease in the estimated road surface gradient can be suppressed. As a result, the creep torque can be increased appropriately according to the road surface gradient, which makes it possible to suppress the vehicle from sliding downhill backwards. Accordingly, the unpleasant sensation imparted on the driver from the vehicle sliding backwards can be minimized. Thus, a control apparatus of a vehicle that suppresses downhill sliding of a vehicle on an upward slope can be provided.

In this embodiment, when the absolute value of the vehicle speed is equal to or below the predetermined value V(0), rate limit processing is executed. Alternatively, however, rate limit processing may also be executed when, for example, the downhill vehicle speed is within a predetermined range that includes a lower limit value of a vehicle speed corresponding to a rotation speed that can be detected by the wheel speed sensor. In this case as well, executing the rate limit processing on the estimated gradient makes it possible to suppress an abrupt change in the estimated gradient even if the derivative value of the output value detected by the wheel speed sensor changes abruptly. Therefore, a decrease in creep increase torque due to a change in the estimated gradient can be suppressed on an upward slope. As a result, it is possible to suppress a vehicle on an upward slope from sliding downhill.

Hereinafter, a control apparatus of a vehicle according to a second embodiment of the invention will be described. The control apparatus of a vehicle according to this second embodiment differs from the control apparatus of a vehicle according to the first embodiment only in that the control structure of the program executed by the HV_ECU 320 is different. All other structure is the same as that of the control apparatus of a vehicle according to the first embodiment described above. Like parts will thus be denoted by like reference numerals and have the same function so detailed descriptions thereof will not be repeated.

This embodiment is characteristic in that the HV_ECU 320 corrects the estimated gradient based on the acceleration of the vehicle detected by the G sensor 324 when there is no predetermined relationship between the acceleration of the vehicle detected by the G sensor 324 and the estimated gradient that is calculated based on the difference between the output value of the G sensor 324 and the derivative value of the wheel speed.

Hereinafter, the control structure of a program executed by the HV_ECU 320 which serves as the control apparatus of a vehicle according to this embodiment will be described with reference to FIG. 8.

Figure 3:
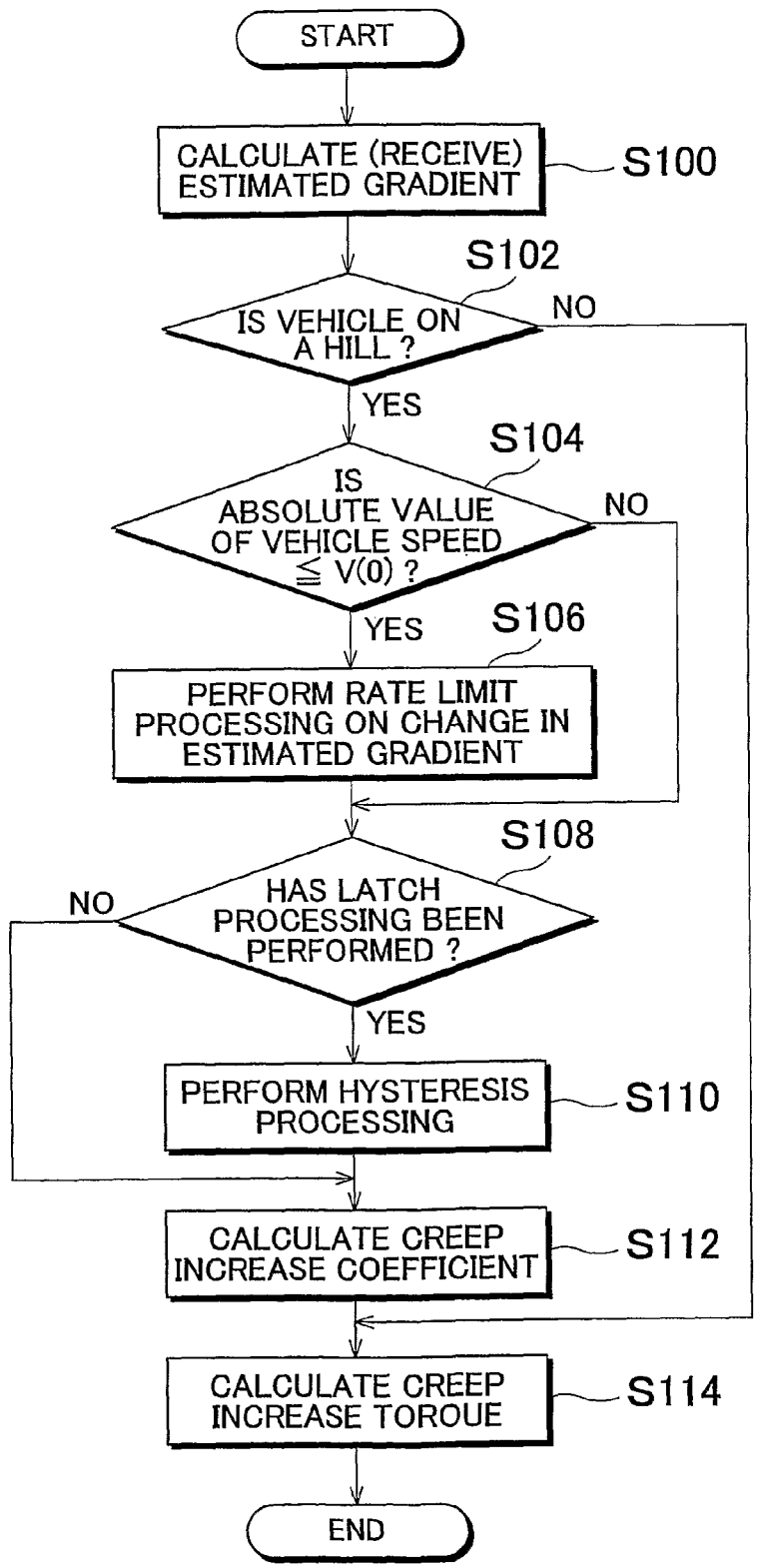
FIG. 3 is a flowchart illustrating a control structure of a program executed by a HV_ECU which serves as the control apparatus of a vehicle according to the first embodiment.
Figure 8:
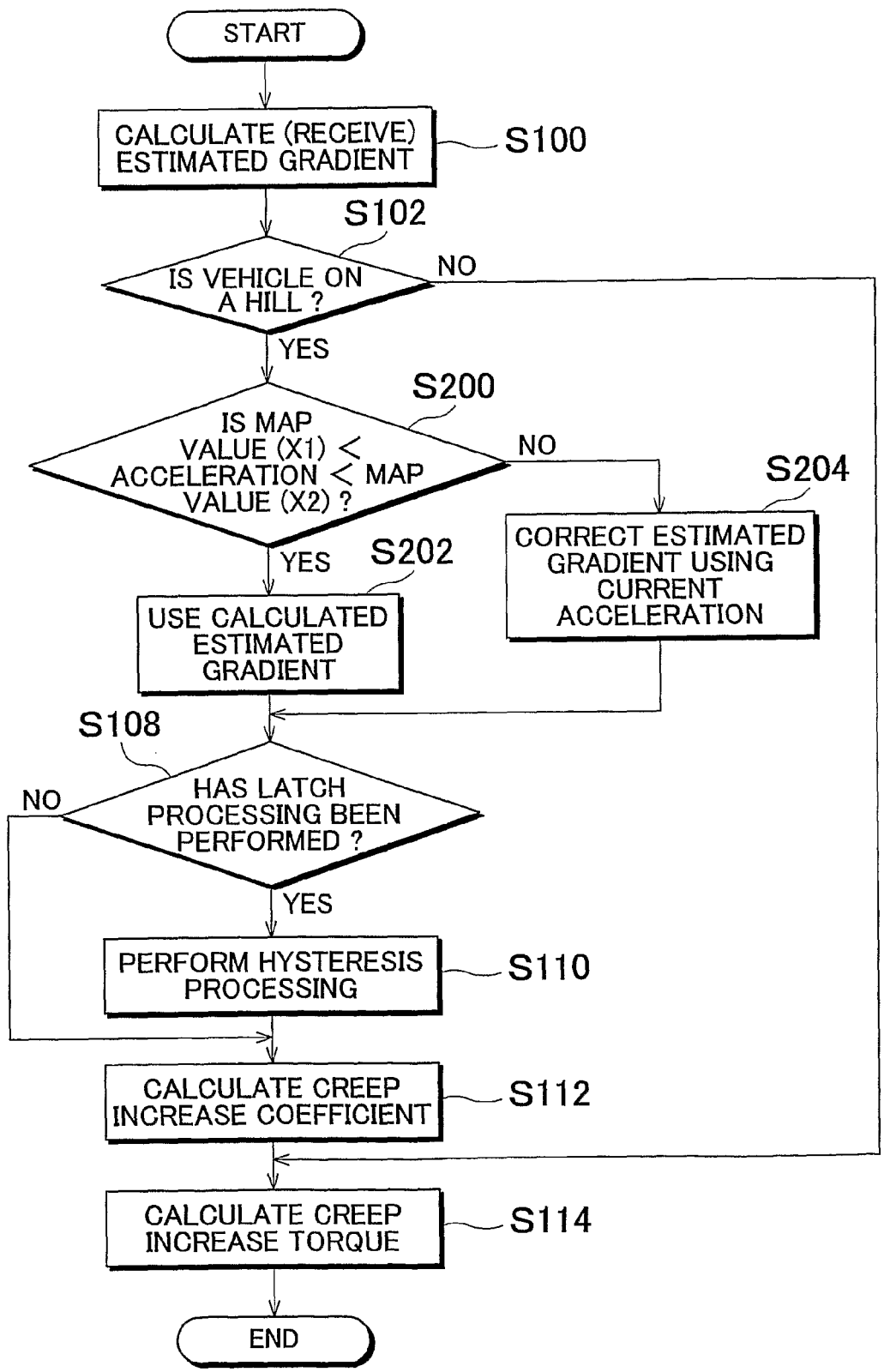
FIG. 8 is a flowchart illustrating the control structure of a program executed by a HV_ECU which serves as the control apparatus of a vehicle according to a second embodiment.

Steps in the flowchart shown in FIG. 8 that are the same as steps in the flowchart in shown FIG. 3 described above will be denoted by like step numerals and the processes of like steps are the same so detailed descriptions thereof will not be repeated.

Figure 9:
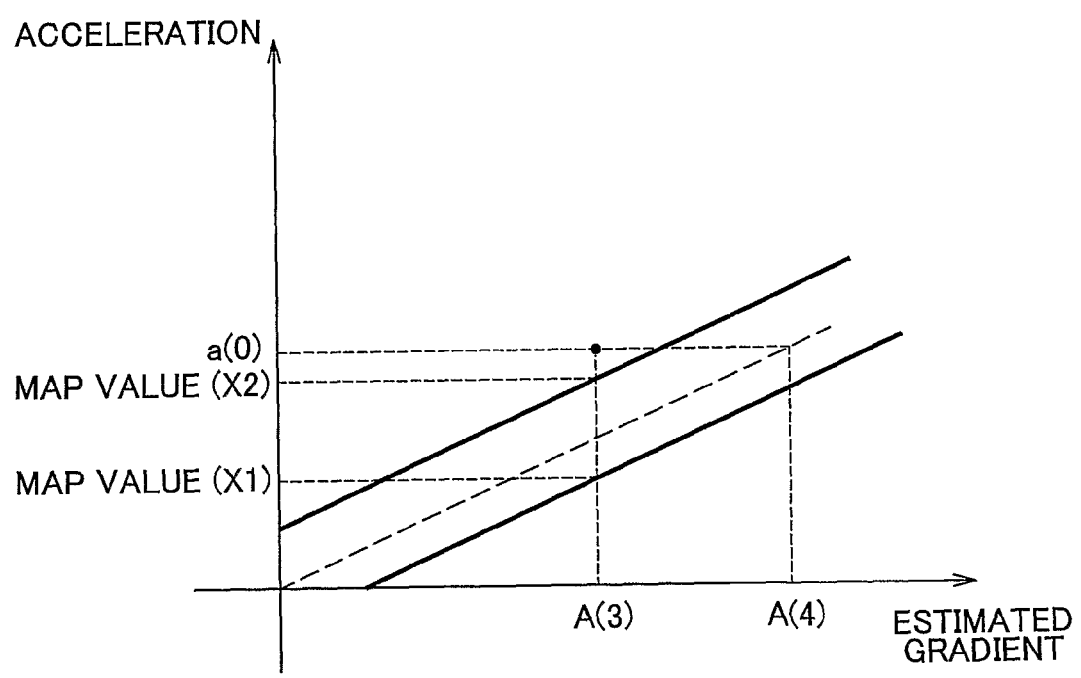
FIG. 9 is a graph showing the relationship between the output value of a G sensor and the estimated gradient.

In FIG. 200, the HV_ECU 320 determines whether the acceleration of the vehicle detected by the G sensor 324 is within a range that is larger than a map value (X1) and smaller than a map value (X2) arrived at by the estimated gradient calculated (or received) in step S100 and a map shown in FIG. 9.

In the map shown in FIG. 9, the vertical axis represents the acceleration detected by the G sensor 324 and the horizontal axis represents the estimated gradient. The map value (X1) and the map value (X2) are set to increase linearly as the estimated gradient increases, as shown by the solid line in FIG. 9. The map value (X1) and the map value (X2) are not particularly limited, and are values that are appropriately determined through testing or the like, for example. If the acceleration detected by the G sensor 324 is outside of the range between the map value (X1) and the map value (X2), then it can be determined that the estimated gradient is changing due to an abrupt change in the derivative value of the wheel speed. If the acceleration detected by the G sensor 324 is within the range between the map value (X1) and the map value (X2) (i.e., YES in step S200), the process proceeds on to step S202. If not (i.e., NO in step S200), the process proceeds on to step S204.

In step S202, the HV_ECU 320 calculates the estimated gradient calculated in step S100 as the estimated gradient of the current calculation cycle. In step S204, the HV_ECU 320 corrects the estimated gradient based on the acceleration detected by the G sensor 324. The method by which this correction is made is not particularly limited, and may include, for example, correcting an estimated gradient A(4) in which an acceleration a(0) is made a middle value (indicated by the broken line in the drawing) as the estimated gradient of the current calculation cycle when the calculated estimated gradient is A(3) and the detected acceleration is a(0), or correcting the estimated gradient after comparing an output value from a resolver or the like, not shown, provided in the motor 140A with the output value from the G sensor 324.

The operation of the HV_ECU 320 which serves as the control apparatus of a vehicle according to this embodiment and is based on the foregoing structure and flowchart will now be described.

This description will assume a case in which, for example, the vehicle is stopped facing uphill on an upward slope. While the vehicle is stopped, the output value detected by the wheel speed sensor 322 is zero so the derivative value of the wheel speed is also zero. Therefore, the estimated gradient is calculated based on the output value from the G sensor 324. Here, if the driver releases the brake pedal, backward force from the weight of the vehicle will act on the vehicle. If that backward force is greater than the creep torque that is output in the forward direction, the vehicle will start to move backwards. The vehicle speed will then increase over time. If at that time the vehicle speed is below the vehicle speed Va which corresponds to a rotation speed that can be detected by the wheel speed sensor 322, the output value is zero.

When the vehicle speed becomes Va which corresponds to a rotation speed that can be detected by the wheel speed sensor 322 at time T(1), then an output value corresponding to the vehicle speed is output from the wheel speed sensor 322. At this time the estimated gradient is calculated based on the output value from the G sensor 324 and the derivative value of the output value from the wheel speed sensor 322 (S100).

If the calculated estimated gradient is equal to or greater than a predetermined gradient A(X) (i.e., YES in step S102), then it is determined that the vehicle is moving or stopped on an upward slope. When the vehicle speed reaches Va and the derivative value of the vehicle speed is calculated to be large, the estimated gradient is calculated to be a smaller value than the estimated gradient that was calculated before the rotation speed corresponding to the vehicle speed Va was detected. If at this time the output value from the G sensor 324 is not within the range between the map value (X1) and the map value (X2) which are defined by the calculated estimated gradient and the map shown in FIG. 9 (i.e., NO in step S200); then the estimated gradient is corrected with the detected output value from the G sensor 324 as the middle value shown by the broken line in FIG. 9. As a result, a sudden change in the estimated gradient can be suppressed. After latch processing and hysteresis process have been performed (i.e., YES in step S108; S110), the creep increase coefficient is calculated based on the estimated gradient after hysteresis processing (S112). Then the creep increase torque is calculated based on the creep increase coefficient and the driving force map (S114).

At this time, an abrupt change in the creep increase torque can be suppressed by an abrupt change in the estimated gradient being suppressed. Therefore, the vehicle can be suppressed from sliding downhill due to an abrupt decrease in the creep increase torque.

As described above, with the control apparatus of a vehicle according to this embodiment, it can be determined that the estimated road surface gradient is changing abruptly, i.e., that the derivative value of the rotation speed is changing abruptly, when the acceleration detected by the G sensor is not within a predetermined range that corresponds to the estimated road surface gradient. Therefore, an abrupt change in the creep torque can be suppressed by estimating the road surface gradient by appropriately correcting the road surface gradient based on the detected acceleration. Accordingly, in a vehicle that is stopped on an upward slope, an abrupt change in the estimated road surface gradient can be suppressed when the driver releases the brake pedal and the vehicle starts to move. That is, an abrupt decrease in the estimated road surface gradient can be suppressed. As a result, on an upward slope, the creep torque can be increased appropriately according to the road surface gradient so the vehicle can be suppressed from sliding downhill backwards. Accordingly, the unpleasant sensation imparted on the driver from the vehicle sliding backwards can be minimized. Thus, a control apparatus of a vehicle that suppresses downhill sliding of the vehicle on an upward slope can be provided.

The embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A control apparatus of a vehicle, which controls driving force according to a road surface gradient, comprising:
    an acceleration detecting device that detects acceleration of the vehicle;
    a rotation speed detecting device that detects a rotation speed of a wheel;
    a vehicle speed calculating portion that calculates a vehicle speed based on the rotation speed detected by the rotation speed detecting device; and
    an estimating portion that estimates the road surface gradient based on the acceleration and the rotation speed,
    wherein the estimating portion is adapted to limit a change amount of the estimated road surface gradient according to a preset map when an absolute value of a current vehicle speed is equal to or below a lower limit value of an absolute value of a vehicle speed corresponding to the rotation speed which can be detected by the rotation speed detecting device.

2. The control apparatus of a vehicle according to claim 1, wherein the estimating portion limits the change amount to equal to or below a predetermined change amount.

3. The control apparatus of a vehicle according to claim 2, wherein a motor which serves as a driving source that generates the driving force is mounted in the vehicle, and the control apparatus controls the motor according to the estimated road surface gradient.

4. The control apparatus of a vehicle according to claim 1, wherein a motor which serves as a driving source that generates the driving force is mounted in the vehicle, and the control apparatus controls the motor according to the estimated road surface gradient.

5. A control apparatus of a vehicle, which controls driving force according to a road surface gradient, comprising:
    an acceleration detecting device that detects acceleration of the vehicle;
    a rotation speed detecting device that detects a rotation speed of a wheel; and
    an estimating portion that estimates the road surface gradient based on the acceleration and the rotation speed,
    wherein the estimating portion estimates the road surface gradient by correcting the road surface gradient based on the detected acceleration when the detected acceleration is not within a predetermined range corresponding to the estimated road surface gradient.

6. The control apparatus of a vehicle according to claim 5, wherein a motor which serves as a driving source that generates the driving force is mounted in the vehicle, and the control apparatus controls the motor according to the estimated road surface gradient.

7. A control method of a vehicle including a control unit, which controls driving force according to a road surface gradient, the method comprising:
    detecting acceleration of the vehicle;
    detecting a rotation speed of a wheel;
    calculating a vehicle speed based on the detected rotation speed;
    estimating the road surface gradient based on the acceleration and the rotation speed; and
    limiting a change amount of the estimated road surface gradient using the control unit according to a preset map when an absolute value of a current vehicle speed is equal to or below a lower limit value of an absolute value of a vehicle speed corresponding to the rotation speed which can be detected.

8. The control method of a vehicle according to claim 7, further comprising the step of:
    limiting the change amount to equal to or below a predetermined change amount.

9. The control method of a vehicle according to claim 8, further comprising the step of:
    controlling, according to the estimated road surface gradient, a motor which serves as a driving source that generates the driving force.

10. The control method of a vehicle according to claim 7, further comprising the step of:
    controlling, according to the estimated road surface gradient, a motor which serves as a driving source that generates the driving force.

11. A control method of a vehicle including a control unit, which controls driving force according to a road surface gradient, the method comprising:
    detecting acceleration of the vehicle;
    detecting a rotation speed of a wheel;
    estimating the road surface gradient based on the acceleration and the rotation speed; and
    estimating the road surface gradient by correcting the road surface gradient using the control unit based on the detected acceleration when the detected acceleration is not within a predetermined range corresponding to the estimated road surface gradient.

12. The control method of a vehicle according to claim 11, further comprising the step of:
    controlling, according to the estimated road surface gradient, a motor which serves as a driving source that generates the driving force.

13. A control apparatus of a vehicle, which controls driving force according to a road surface gradient, comprising:
    an acceleration detecting device that detects acceleration of the vehicle;
    a rotation speed detecting device that detects a rotation speed of a wheel; and
    an estimating portion that estimates the road surface gradient based on the acceleration and the rotation speed,
    wherein the estimating portion is adapted to limit a change amount of the estimated road surface gradient to equal to or below a predetermined change amount according to a preset map until the rotation speed is detected by the rotation speed detecting device.

* * * * *